2,919,973
Patented Jan. 5, 1960

2,919,973
METHOD OF PREPARING CATALYTICALLY ACTIVE ALUMINA

William D. Stillwell, Shaker Heights, Lubertus Bakker, Cleveland Heights, and Jack R. Lytle, Seven Hills Village, Ohio No Drawing. Application October 18, 1956
Serial No. 616,630

3 Claims. (Cl. 23—143)

This invention relates to an active alumina catalyst, support, or carrier for other catalytically active materials, to a process of making said catalyst, carrier or support, and to a process utilizing said catalyst.

The general use of active alumina as a catalyst, as a component of a catalyst, such as for a base or carrier upon which is deposited or within which is incorporated various materials is known. Hydrocarbon contact masses made up wholly or partly of alumina are used in many organic reactions among which may be mentioned the aromatization and dehydrogenation of hydrocarbon fractions as well as the dehydration of alcohols to the corresponding olefins and ethers.

Active aluminas utilized in present day contact masses are either crystalline or amorphous in nature and are prepared by a variety of different procedures. It is recognized by those skilled in the art that there are substantial variations in the catalyst properties of the many different forms of active alumina. These differences depend in many cases upon unknown chemical and physical properties imparted to the catalyst during the manufacture thereof. Thus, it may be stated that the preparation of an active alumina is still an art as opposed to a science wherein one may predict with reasonable certainty the resulting catalyst activity of a product from the method of manufacture.

The instant invention relates to an activated alumina of the gel type which is prepared by reacting sodium aluminate with hydrochloric acid. It is recognized that the art supports various activated alumina gel preparation methods based on this general reaction, yet nowhere has the procedure employed according to the instant process been utilized. Because of the exceptional activity developed by the catalyst produced by the process of the invention enabling the use of lower reaction temperatures in alkanol and alkenol dehydration reactions and the fact that this exceptional activity is not developed except by rigidly adhering to the procedure hereinafter set forth, it will be apparent that a new catalyst may be produced according to the procedure set forth herein. Substitution of other acids for hydrochloric acid in the process of the herein described invention have not accomplished the same results.

It has been found that the catalyst of the herein described invention is particularly effective as an alcohol dehydration catalyst. It is well known that active aluminas are frequently employed in dehydration reactions and this is particularly so in Europe where olefins are produced chiefly through alkanol and alkenol dehydration. In this regard active aluminas are employed for the dehydration of ethanol, butanol and other alcoholic hydrocarbons. In particular, active aluminas are used for the dehydration of butanol to butylene, occasionally for the ultimate production of butadiene which is used extensively in polymerization processes designed for the production of synthetic rubbers.

One species of the catalyst produced according to the invention is especially reactive for the dehydration of alcohols to the corresponding olefin or ether. It is therefore contemplated for dehydrating alcohols having from about 2 to about 12 carbon atoms for obtaining the corresponding olefin or ether therefrom.

Customary space velocities utilized in dehydration reactions, for example in Europe, generally range from about 1 to about 5 liters of feed stock per liter of catalyst per hour with active alumina catalyst, and the temperatures during the dehydration reaction usually run from about 375° C. to about 425° C. These space velocities are customary when utilizing active alumina catalysts in the form of tablets, pills or granules having a diameter of about ⅛ inch. It will be apparent that minor changes in the temperature and/or space velocity are usually made for variations in the particle sizes of the catalyst. Generally the activity of a particular catalyst bed increases somewhat as the size of the catalyst granules or pills decrease, permitting the use of slightly lower temperatures and/or slightly increased space velocities. However, the order of magnitude of these permissible changes is relatively slight as compared to the benefits derived by utilizing the herein described catalyst for dehydration reactions. It will be apparent that any alumina catalyst which can appreciably lower the required reaction temperature while simultaneously maintaining the same yield of olefins marks a substantial improvement over the art.

According to the invention herein described a catalyst may be produced which permits dehydration reactions of the type heretofore referred to, to be conducted at temperature ranges substantially lower than customary. In particular, the catalyst is especially useful for dehydration of alcohols having from about 2 to about 12 carbon atoms utilizing temperatures generally ranging from about 275° C. to about 375° C.

Fundamentally, preparation of the catalyst involves reacting sodium aluminate with hydrochloric acid primarily under acidic conditions with a final adjustment of the pH of the reaction mass to basic conditions. Thereafter the gelatinous product is dried to a vitreous mass which is washed free of salts and then activated by calcination. It is essential to the production of the catalyst that each of the steps be carried out as set forth. Thus, it is essential that the sodium aluminate and hydrochloric acid be combined in such a manner as to maintain the reaction mass acidic throughout a major portion of the reaction period and that the pH of the mass be adjusted to basic conditions after most of the reaction has proceeded to completion. Furthermore, it is essential that the gelatinous mass of alumina hydroxide produced be first dried before washing the sodium chloride produced by the reaction therefrom, and that the washed mass thereafter be activated by calcination.

The reaction of the sodium aluminate and hydrochloric acid is preferably carried out batchwise to facilitate ready control; however, continuous operations are contemplated as within the scope of the invention. Thus, the reaction of the sodium aluminate and hydrochloric acid may be carried out batchwise by adding the sodium aluminate to the whole batch quantity of hydrochloric acid employed so that conditions will be acidic during most of the reaction, or the sodium aluminate and hydrochloric acid may simultaneously be added to a reaction vessel, care being taken to see that the mixture in the reaction vessel is acidic throughout substantially the entire period of the reaction.

Agitation of the reaction mass should be accomplished throughout the period of mixing in order to prevent the occurrence of localized zones in the vessel having basic conditions, and in some cases it has been found that the degree of agitation is influencing upon the activity of the product obtained. For the production of a dehydration catalyst vigorous agitation of the reaction mass is preferred throughout the period of the reaction. Where the catalyst produced is not necessarily contemplated for use in dehydrative reactions, agitation sufficient to overcome localized basic conditions and to maintain a homogeneous mixture may be acceptable. However, the degree of agitation can readily be determined empirically in any event bearing regard for the ultimate use thereof, for example as a dehydration catalyst, support for other catalyst ingredients, etc.

After substantially all of the sodium aluminate and hydrochloric acid have reacted to form the hydroxide and salt, the pH of the reaction mass is adjusted to a pH in excess of 7.2 and preferably below 9.5. The addition of the ingredients may be carried out, of course, as one continuous addition resulting ultimately in the alkaline pH where the rate of addition of the sodium aluminate is such as to permit almost immediate reaction between the reactants to take place. Good results are obtained when the pH is adjusted to a point between about 7.6 and 8.9 with optimum dehydration activity usually developed when the pH is adjusted to from about 8.2 to 8.8. Adjustment of the pH can be accomplished with any hydroxide or basic component the cation of which is removable from the mass by washing or heating or where final catalyst specifications permit, with a compound the cation and/or anion of which is not removable by washing or heating. Preferably a slight excess of sodium hydroxide may be employed when desirable. Similarly, adjustment of the pH may be made with ammonium salts of desirable impregnants or other basic salts of impregnants. Of course, combinations of various alkaline hydroxide and/or salts may be used when appropriate. In any event, however, it is essential that the pH of the reaction mass be adjusted to alkaline conditions in order to obtain the catalyst of the herein described invention.

Since the reaction of the hydrochloric acid with the sodium aluminate is almost instantaneous when accomplished with good mixing and at a low initial pH, as for example when the sodium aluminate solution is first added to the hydrochloric acid, on particular holding period is usually necessary before adjusting the pH to the alkaline side because most of the reaction has been completed under rapidly occurring acidic conditions. However, it is essential that substantially all of the hydrochloric acid be reacted with sodium aluminate under acid conditions. Otherwise, when the reaction is conducted under basic conditions, the desired activity is not produced. After substantial completion of the reaction, the reaction mass is made alkaline by adding, for example, the necessary excess of sodium aluminate.

The concentration of the sodium aluminate and hydrochloric acid solutions have not been found to be critical to the obtainment of the high degree of dehydration activity, although it is generally preferable to utilize as high a concentration of each ingredient as is possible for obtaining consistently suitable viscosities in the reaction mass for handling purposes without unnecessarily increasing the cost associated with drying. In general, after the reaction it is desirable to have a solid content in the reaction mass ranging from about 1 to about 5% solids or higher when possible. This may be accomplished by utilizing high concentrations of the reactants and mixing them under initially dilute conditions designed to obtain this result, or by utilizing a high concentration of one reactant and a low concentration of the other reactant directly for mixing. Thus, solutions of hydrochloric acid as high as 330 grams of HCl per liter may be employed and similarly concentrations of sodium aluminate as high as 300 grams per liter may be employed. Preferably, to facilitate ease in obtaining a practical solids content in the reaction mass, concentrations of hydrochloric acid from about 10 to about 50 grams per liter and concentrations of sodium aluminate of from about 35 to about 195 grams per liter may be employed. The concentrations of hydrochloric acid and sodium aluminate utilized herein are reported as HCl and $NaAlO_2$ respectively.

Under atmospheric pressure conditions, the reaction may be caused to proceed at temperatures ranging from about 10° C. to the boiling point of the reaction mass. Although the catalyst may be produced by carrying out the reaction over this relatively broad temperature range, it appears that the greatest dehydration activity is developed when the reaction is carried out at temperatures ranging from about 15° C. to about 45° C. with extremely vigorous agitation.

After the reaction mass has been adjusted to an alkaline pH it may be filtered where desirable and then dried, or dried without prior filtration; although the former method is usually desired from a cost point of view in plant practice. It is essential however that no appreciable amount of washing be attempted prior to drying. The object of drying is to expel the uncombined water and obtain a vitreous mass of alumina hydroxide ($Al_2O_3 \cdot 3H_2O$) containing the salt formed by the reaction and this may be accomplished, for example, by drying at temperatures of from about 100° C. to 125° C. Other methods of drying may be used, of course. For example, drying may be carried out under vacuum conditions at reduced temperatures. The dried gel at this point is hard and horny having an opaque glossy appearance.

Where it is desirable to spray dry the gelatinous mass, the alkaline strike solution may be first filtered to obtain highly viscous slurry. Such a slurry as is obtained, for example, by pressure filtration may then be vigorously agitated for a period of time sufficient to reduce the viscosity thereof for handling purposes. This less viscous slurry may then be spray dried in conventional apparatus to obtain any desired physical formation although microspheres will be found to be a particularly advantageous form for use in fluidized type reactors. These may be produced according to any of the well known techniques applied to the operation of spray drying apparatus.

After drying to a vitreous mass the gel is washed free of sodium chloride. Although it is not essential that all of the salt formed during the strike be removed subsequent to drying, since appreciable quantities may be removed through the prior filtration of the reaction mass, it is essential that most of the salt retained in the mass resulting from a dewatering operation, such as filtration, be washed from the vitreous mass obtained after drying. Attempts to produce the catalyst of the invention by washing prior to drying have proven futile.

In general, the washing opertaion should be carried out by washing with water until a soda content ($Na_2O$) of the calcined material is less than about .2%. Where low chloride contents are desirable, dilute $NH_4OH$ may be employed. Where the catalyst of the invention is used as a carrier or support for other ingredients, the soda content ($Na_2O$) of course may be greater or less than this amount where desirable. However, in general, as is well known, the soda content of catalysts usually tends to increase coke formations and most alumina catalyst specifications call for minimized soda contents. It may be mentioned at this point that the dried gel decrepitates vigorously when treated with water, thereby aiding in the removal of the salt therefrom.

It is not fully understood why the catalyst of the herein described invention may only be produced by washing the salts therefrom after drying but it may be that the predrying in the presence of the salt has an appreciable affect on the porosity of the catalyst.

Calcining of the washed predried alumina hydroxide vitreous mass to obtain an active alumina may be carried out according to any of the well known calcining techniques suitable for producing an active alumina, that is, an alumina having water adsorption characteristics. Usual temperatures of calcination range generally from about 300° C. to 850° C. However, to produce a catalyst having high dehydration activity the calcination should be carried out at temperatures generally ranging from about 500° C. to about 700° C.

The following are specific examples illustrating the preparation of the catalyst according to the invention and further illustrating a novel dehydration process in which the catalyst is employed.

*Example I*

An alumina gel is prepared as follows: 48.2 pounds of sodium aluminate ($NaAlO_2$) are dissolved in 72 gallons of water to make a sodium aluminate solution to react with the hydrochloric acid. Separately 68.4 pounds of 20° Bé. hydrochloric acid are mixed with 116 gallons of water. The sodium aluminate solution is added continuoulsy to the hydrochloric acid solution over a period of about a half hour. The temperature of the reaction mix during the addition of the sodium aluminate to the hydrochloric acid ranges from about 15° C. to about 30° C. Throughout the addition of the sodium aluminate the reaction mass is vigorously agitated and the addition is continued until the pH reaches 8.5. Thereafter the strike solution is filtered to a solids content of about 6% to 7% solids. Next the filter cake is tray dried at a temperature of about 125° C. The dried gel is a hard powdery precipitate that is glossy and opaque in nature. It is then subjected to washing to remove the residual sodium chloride. In this regard 300 gram samples of the tray-dried precipitate are each subjected to three washings each with an ammoniacal solution of 30 cc. of concentrated ammonium hydroxide in 3,000 cc. of water and thereafter subjected to three additional washings with plain tap water. Samples of the dry washed precipitate are then formed into ⅛ inch cylindrical pellets and subjected to calcination to produce an active aluimna gel.

Pellets of the dry washed precipitate are calcined at 550° C. and thereafter employed for the dehydration of 2-ethylhexanol-1 to isoctenes. The alcohol in this and the following examples have a boiling point from 184° C. to 188° C. The alcohol is passed through a fixed bed of the pelleted calcined alumina gel at a space velocity varying from 2.4 to 2.8 liters of alcohol per liter of catalyst per hour and at a dehydration temperature of about 350° C. It will be found that the catalyst converts nearly 100% (by weight) of the 2-ethylhexanol-1 to isoctenes.

To test the activity of the catalyst at lower dehydration reaction temperatures, another sample of the catalyst calcined at 550° C. is employed for dehydrating 2-ethylhexanol-1 to isoctenes. For this test the alcohol is passed through a fixed bed of ⅛ inch cylindrical catalyst pills at a space velocity of from 2.4 to 2.8 liters of alcohol per liter of catalyst per hour at a temperature of about 250° C. It is found that about 85% (by weight) of the alcohol is converted to isoctenes. Below 250° C. the conversion rapidly falls off.

*Example II*

An alumina hydroxide gel is prepared as in Example I except that the catalyst in pellet form is calcined at 700° C. Thereafter the activity of the catalyst may be determined by passing 2-ethylhexanol-1 over a bed of the pelleted ⅛ inch alumina gel catalyst at a space velocity from 2.4 to 2.8 liters of alcohol per liter of catalyst per hour and at a temperature of about 360° C. It will be found that at this temperature almost 100% conversion of the 2-ethylhexanol-1 to the isoctenes is affected.

To test the activity of the catalyst at lower temperatures, 2-ethylhexanol-1 may be passed over a bed of the catalyst under temperature conditions of about 265° C., with a space velocity of from about 2.4 to 2.8 liters of alcohol per liter of catalyst per hour. It will be ascertained that about 85% (by weight) of the alcohol is converted to the corresponding olefins.

The weight of the catalyst employed in each of the dehydration tests is about 70 grams of catalyst per liter.

Although 2-ethylhexanol-1 is employed in each of the examples, it will be apparent that this presentation is merely for illustration purposes and that the process utilizing the novel catalyst herein described may be employed with other alcohols. Generally it is contemplated that the novel catalyst may be employed with alcohols having from 2 to 12 carbon atoms as for example, ethanol, propanol, butanol, etc. as well as unsaturated alcohols having from 2 to 12 carbon atoms. In this regard it will be found that the novel dehydration catalyst may most advantageously be employed for dehydration of alcohols when a space velocity of from about 1 to about 5 liters of alcohol per liter of catalyst per hour is used with reaction temperatures generally ranging from about 250° C. to about 375° C. Although the chief benefit of the dehydration process is the fact that lower reaction temperatures are permissible than customarily employed, it will be apparent that higher temperatures than preferred may also be utilized, however, with less advantageous results.

It will also be apparent to those skilled in the art that the novel catalyst may be employed with advantageous results for dehydration of alcohols to ethers. In any case of dehydration a process is contemplated wherein the alcohol is passed over the catalyst of the invention under dehydrating conditions of temperature and space velocity. Higher space velocities and/or lower temperatures, of course, are employed for the production of the ethers.

The novel alumina gel produced according to the described process may also be used as a support or base carrier for other reactive ingredients. In this regard it has been found in several cases to be superior in performance alumina gel supports or carriers found on the commercial market.

Among the various catalytic elements which may be incorporated in or otherwise supported upon the novel gel catalysts described herein and used therefor either as the principal catalytic ingredient or as a promoter therefor may be mentioned such heavy metals as copper, silver, gold, zinc, cadmium, mercury, thallium, manganese, bismuth, indium, gallium, germanium, tin, lead, antimony, selenium, tellurium, arsenic, iron, cobalt, nickel, palladium, rhodium and various combinations thereof. Such metals may be suitably utilized generally in either the metallic or oxide forms of the element although in some cases it will be apparent that the sulfides or other compounds thereof may be employed. Other elements frequently employed in catalytic reactions either in the metallic state or as the oxide or other compound of the element and which may be supported upon the novel gel catalyst described herein are chromium tungsten, scandium, zirconium, titanium, magnesium, beryllium, cerium, barium, strontium, calcium, as well as potassium, sodium and lithium.

It goes without saying that it is contemplated that the novel gel support may be utilized as a support for any of the art known elements and compounds suitably used with alumia gel for the various catalytic organic synthesis processes and in the amounts conventionally employed. Similarly, the catalytic elements or compounds therefor may be incorporated in the novel gel support by such conventional means as impregnation and/or co-precipitation, it being borne in mind that the basic steps in the production of the novel catalyst should not be altered to facilitate incorporation by such a means as co-precipitation.

Oxidation catalysts which may suitably be employed with the novel gel and support thereon may be vanadium oxide, silver oxide and thorium oxide. Thorium oxide may also be employed as a synthesis catalyst for the synthesis of organic sulfur compounds. Nickel, cobalt, iron, tungsten, molybdenum, platinum, palladium, ruthenium, rhodium, chromium and copper may suitably be employed with the gel catalyst either alone or in combination with each other preferably in the form of the oxides for dehydrogenation and hydrogenation reactions, Suitable promoters and stabilizers which are frequently utilized with principal catalytic elements or compounds may be potassium, halogenites, boron, beryllium, cadmium, barium, and strontium to mention but a few.

By way of example, the novel gel catalyst when utilized as a support for say chromium may be impregnated with chromic acid and thereafter the chromic acid converted to the oxide form by calcination to form a chrome oxide containing catalyst having, for example, about 20% by weight or $Cr_2O_3$. Accordingly, it will be apparent that it is contemplated the gel catalyst may be utilized alone for dehydrogenation reactions or in combination with art known elements and compounds as a support thereof.

This application is a continuation-in-part of copending application bearing Serial No. 573,325, now abandoned, entitled Hydrogenation Process and Catalyst Therefor, filed March 23, 1956.

We claim:

1. The method of producing catalytically active alumina wherein substantially all of the alumina prior to calcination operations is present in its trihydrate form comprising reacting sodium aluminate with hydrochloric acid in an agitated aqueous solution under acidic conditions to produce a gelatinous mass of alumina hydroxide containing sodium chloride, adjusting the pH of the gelatinous mass to an alkaline pH between 7.2 and 9.5 by adding a basic component to said gelatinous mass, drying said alkaline gelatinous mass of alumina hydroxide containing sodium chloride to a vitreous mass of $Al_2O_3.3H_2O$ containing sodium chloride and substantially free of uncombined water, thereafter washing said sodium chloride from said dried mass and activating the washed alumina hydroxide mass by calcination.

2. The method according to claim 1 wherein said reaction of sodium aluminate with hydrochloric acid is carried out at a temperature from about 10° C. to the boiling point of the aqueous solution, wherein the pH is adjusted to an alkaline pH of from about 7.6 to about 8.9, and wherein the calcination is conducted at a temperature from about 300° C. to about 850° C.

3. The method according to claim 1 for producing an active alumina gel for the dehydration of alcohols wherein said reaction of sodium aluminate with hydrochloric acid is carried out at a temperature from about 15° C. to about 45° C., wherein the pH is adjusted to an alkaline pH of from about 8.2 to about 8.8, and wherein the calcination is conducted at a temperature from about 500° C. to about 700° C.

References Cited in the file of this patent

UNITED STATES PATENTS

| | | |
|---|---|---|
| 2,406,420 | Weiser et al. | Aug. 27, 1946 |
| 2,468,764 | Laurent | May 3, 1949 |
| 2,657,115 | Ashley | Oct. 27, 1953 |

OTHER REFERENCES

Feachem et al.: Journal of the Chem. Soc. (London), March 1948, pp. 267–272.

UNITED STATES PATENT OFFICE

CERTIFICATE OF CORRECTION

Patent No. 2,919,973                  January 5, 1960

William D. Stillwell et al.

It is hereby certified that error appears in the above numbered patent requiring correction and that the said Letters Patent should read as corrected below.

In the grant, lines 1, 2 and 3, for "William D. Stillwell, of Shaker Heights, Lubertus Bakker, of Cleveland Heights, and Jack R. Lytle, of Seven Hills Village, Ohio," read -- William D. Stillwell, of Shaker Heights, Lubertus Bakker, of Cleveland Heights, and Jack R. Lytle, of Seven Hills Village, Ohio, assignors to The Harshaw Chemical Company, of Cleveland, Ohio, a corporation of Ohio, --; lines 12 and 13, for "William D. Stillwell, Lubertus Bakker, and Jack R. Lytle, their heirs" read -- The Harshaw Chemical Company, its successors --; in the heading to the printed specification, lines 4, 5 and 6, for "William D. Stillwell, Shaker Heights, Lubertus Bakker, Cleveland Heights, and Jack R. Lytle, Seven Hills Village, Ohio" read -- William D. Stillwell, Shaker Heights, Lubertus Bakker, Cleveland Heights, and Jack R. Lytle, Seven Hills Village, Ohio, assignors to The Harshaw Chemical Company, Cleveland, Ohio, a corporation of Ohio --; column 3, line 41, for "on particular" read -- no particular --; column 7, line 10, for "weight or" read -- weight of --.

Signed and sealed this 12th day of July 1960.

(SEAL)
Attest:

KARL H. AXLINE                                                     ROBERT C. WATSON
Attesting Officer                                        Commissioner of Patents